(12) United States Patent
Vestergaard et al.

(10) Patent No.: US 9,776,737 B2
(45) Date of Patent: Oct. 3, 2017

(54) ONBOARD MIXING OF DE-ICING FLUID

(75) Inventors: Stefan Vestergaard, Vanløse (DK); Elo Svanebjerg, Tappernoeje (DK)

(73) Assignee: VESTERGAARD COMPANY A/S, Roskilde (DK)

( * ) Notice: Subject to any disclaimer, the term of this patent is extended or adjusted under 35 U.S.C. 154(b) by 564 days.

(21) Appl. No.: 14/351,711

(22) PCT Filed: Nov. 21, 2011

(86) PCT No.: PCT/EP2011/070583
§ 371 (c)(1),
(2), (4) Date: Apr. 14, 2014

(87) PCT Pub. No.: WO2013/075731
PCT Pub. Date: May 30, 2013

(65) Prior Publication Data
US 2014/0231587 A1    Aug. 21, 2014

(51) Int. Cl.
*B64F 5/00*    (2017.01)
*B64F 5/20*    (2017.01)
*B64F 5/23*    (2017.01)

(52) U.S. Cl.
CPC .............. *B64F 5/0063* (2013.01); *B64F 5/20* (2017.01); *B64F 5/23* (2017.01)

(58) Field of Classification Search
CPC ........ B64F 5/0054; B64F 5/0063; B64F 5/23; F28C 3/08; A62C 5/024
USPC ................. 244/134 C, 134 R; 239/400, 172; 169/14, 15
See application file for complete search history.

(56) References Cited

U.S. PATENT DOCUMENTS

| | | | |
|---|---|---|---|
| 3,243,123 A | 3/1966 | Inghram et al. | |
| 3,533,395 A * | 10/1970 | Yaste | B64F 5/23 126/271.1 |
| 4,723,733 A * | 2/1988 | McClinchy | B64F 5/0063 244/134 C |
| 5,028,017 A | 7/1991 | Simmons et al. | |
| 5,244,168 A | 9/1993 | Williams | |
| 5,282,590 A | 2/1994 | Zwick | |
| 5,490,646 A * | 2/1996 | Shaw | B25J 5/005 244/134 C |
| 6,767,124 B2 * | 7/2004 | Shikami | B01F 3/088 366/152.2 |
| 7,810,988 B2 * | 10/2010 | Kamimura | B01F 3/088 366/160.2 |
| 7,875,202 B2 * | 1/2011 | Ross | C09K 3/185 106/13 |

(Continued)

OTHER PUBLICATIONS

International Search Report for PCT/EP2011/070583 dated Aug. 6, 2012.

*Primary Examiner* — Alexander Valvis
(74) *Attorney, Agent, or Firm* — Nicholas B. Trenkle; Stites & Harbison PLLC

(57) ABSTRACT

A method for de-icing liquid on a surface of an airplane includes supplying de-icing liquid to and through a spraying nozzle of a de-icing vehicle through a pipe that connects the nozzle with a tank assembly of the de-icing vehicle, where the liquid is delivered to the spraying nozzle as a mix of an anti-freeze liquid and additives, the anti-freeze liquid is delivered to the pipe from an anti-freeze liquid tank via a first dosage pump, and the additives are delivered from an additives tank via a second dosage pump.

26 Claims, 5 Drawing Sheets

(56) References Cited

U.S. PATENT DOCUMENTS 8,252,149 B2 * 8/2012 Malatesta ............... B01D 3/06
159/47.3
2009/0294551 A1 12/2009 Smith

* cited by examiner

ONBOARD MIXING OF DE-ICING FLUID

TECHNICAL FIELD

The present invention pertains to removal of ice from the surface of airplanes and prevention of the formation of new ice on the surface of airplanes.

BACKGROUND OF THE INVENTION

Traditionally, removal of ice from airplanes is done in two main steps, the first step being a de-icing step, wherein ice and snow deposited on the surface of the airplane is removed, the second step being an anti-icing step, wherein the surface of the airplane is covered with a protective liquid, which precludes formation of new ice on the surface of the airplane.

In the de-icing step it is known to use a pre-heated liquid, which is a mixture of water and a so called Type 1 de-icing liquid. The Type 1 de-icing liquid has a low viscosity and it is primarily the thermal energy of the liquid, which causes the melting and removal of the ice (and possible snow deposits) from the airplane.

Typically, a Type 1 liquid is a pre-mixed liquid having propylene or ethylene glycol as the main constituents. In addition to this a typical Type 1 liquid comprises a number of so called additives. These additives can for example be agents, which raise the flash point, or which reduce the tendency of formation of foam, or which are anti corrosive, or a mixture of all these, or other, agents.

The Type 1 liquid can be applied to a surface of an airplane in undiluted form, in which form it has the lowest freezing point, or it can be delivered in a premix of for example 50% or 75% Type 1 fluid mixed with water. It is customary to use these mixtures, at higher temperatures, where a higher freezing point of the de-icing liquid can be allowed. A typical Type 1 liquid is constituted by 88% propylene or ethylene glycol, 10% water and 2% additives.

The anti-icing step is performed by applying a protective layer of anti-icing liquid on the surface of an airplane in order to prevent the formation of a new layer of ice on the surface of the airplane before it has left the runway.

The liquid, which is used for anti-icing is a liquid with a rather high viscosity (around 20.000 cST to around 30 000 cSt). The high viscosity of the anti-icing liquid is achieved by adding polymers, which form long molecular strings in the anti-icing liquid. These molecular strings are rather sensitive to mechanical influence from the nozzle through which the anti-icing fluid is sprayed onto the outer surface of the airplane. This is due to the fact that these molecular strings can be broken into smaller pieces in the nozzle. Therefore, the anti-icing liquid is sprayed onto the outer surface of an airplane with a rather low and controlled pressure gradient (pressure drop) through the nozzle, whereby it is avoided that the mechanical influence will become too big. It is furthermore desirable to apply a uniform rather thin layer of the anti-icing liquid to the outer surface of the airplane. Hence, the anti-icing liquid is also sprayed onto said surface at a rather low flow rate, e.g. around 100 l/min.

The anti-icing liquid is called a Type 2 or Type 4 liquid, where the Type 4 liquid has a higher viscosity than the Type 2 liquid. A typical Type 2 or Type 4 liquid consists of 50% propylene or ethylene glycol, 48% water and 2% polymers and additives.

De-icing and anti-icing liquids are traditionally supplied to the airports or service companies, which perform de- and anti-icing for the airports, as Type 1, Type 2 or Type 4 liquids, which airports or service companies need to build up large stocks of these liquids before onset of winter. Moreover, since these liquids are produced by relatively few producers in the world it is often necessary to build up a rather large stock of these liquids in order to secure enough supplies to last a whole winter season. Furthermore, the scarcity of producers of these liquids also means that acquisition of these liquids incur rather big transport expenses in addition to the environmental problems related to the transportation of these liquids around the world. A wrong estimate of how long or hard a winter season will be may thus lead to a situation, wherein the airports and/or before mentioned service providers may run out of de- and anti-icing liquids.

SUMMARY OF THE INVENTION

It is thus an object of the present invention to provide a de- and/or anti-icing vehicle, by which many of the logistical problems mentioned above are alleviated.

According to the present invention, the above-mentioned and other objects are fulfilled by a first aspect of the invention pertaining to a de-icer for airplanes comprising: A self-propelled vehicle provided with a lifting device for lifting and positioning a spraying nozzle in the vicinity of an outer surface of an airplane to be de-iced, the nozzle being fluidly connected to a tank assembly via at least one pipe, wherein the tank assembly comprises separate tanks for an anti-freeze liquid, such as propylene or ethylene glycol, additives, and water, each tank of the tank assembly being fluidly connected to a mixing system via pipes, the mixing system being configured for mixing the liquids from each of the tanks before supplying the mixed liquid to the nozzle.

By an anti-freeze liquid is understood a liquid having a lower freezing point than water, i.e. a liquid having a freezing point, which is lower than zero degrees Celsius.

Hereby is achieved a de-icing vehicle for de-icing airplanes, wherein the de-icing liquid used for the de-icing is mixed onboard the de-icing vehicle. Thus, the individual airports or de-icing service companies operating at any particular airport does not need to build up large stocks of de-icing-fluid. Instead they can buy for example propylene or ethylene glycol, which is the main constituent of most de-icing liquids, from any of the large number of providers of this chemical product and separately order the additives needed at a supplier of additives. The additives do not need to be obtained from one single supplier. One additive can be provided by one supplier and another one from another supplier and so on. The additives can then for example be mixed in the additives tank or before they are put in the tank Examples of additives can be chemical agents that act as surfactants, or flame inhibitors, or de-foamers or anti corrosion agents. In addition to this some kind of colouring, e.g. a dye, can be mixed in with the additives.

This way the novel de-icer described above facilitates an alleviation of the logistical problems that are associated with using pre-mixed de-icing liquids. The main constituents of a presently commercially available de-icing liquid is propylene or ethylene glycol (and water), which are rather cheap to obtain from a provider of these chemical products as compared to the price of the premixed de-icing liquid, which are only produced by a relatively small number of producers in the world. Thus, a much cheaper provision of de-icing liquids is facilitated by the de-icer according to the first aspect of the invention, because all the constituents can be bought from the supplier on the marked providing the best price. Furthermore, a much more secure supply of de-icing liquid is facilitated, because if an airport or de-icing service provider runs out of any of the constituents, then it is easier to find a supplier of said constituent for replenishing said constituent.

Also a more environmentally friendly way of providing de-icing fluid is made possible by the present invention, because the user, i.e. an airport or a de-icing service provider, can choose a supplier of the individual constituents, which is nearby. In this way costs and pollution associated with the transport of said constituents is lowered as compared to using providers of premixed de-icing liquids, which are only located at very few places in the world.

According to a preferred embodiment, the tank assembly may further comprise a tank for a thickener, e.g. a thickener comprising polymers, whereby the de-icer would also be able to function as an anti-icer. Hereby is thus achieved a vehicle, which may be used to de-ice an aircraft, and then immediately after be used as an anti-icer. This has the important advantage that the time in which eventual deposits of snow due to new snowfall or ice may be formed on the aircraft is significantly reduced.

Preferably, each tank of the tank assembly is connected to a respective dosage pump for supplying the individual liquid to the mixing system.

According to a preferred embodiment, the de-icer further comprises flow metering devices measuring the flow of liquid from each pump. Hereby it is possible to monitor—either manually or using a computer—the flow from each pump, and thereby the relative concentration of the individual constituents delivered to the spraying nozzle.

Said constituents may in one embodiment be anti-freeze liquid and additives. Said constituents may in another embodiment be anti-freeze liquid, additives and water. Said constituents may in yet another embodiment be anti-freeze liquid (e.g. propylene or ethylene glycol), additives, water and a thickener (e.g. polymers).

In a preferred embodiment the de-icer further comprises means for adjusting the flow from each of the pumps in dependence of said flow measurement. Hereby it is assured that the correct concentration of the individual constituents is continuously maintained during the use of the vehicle.

In a preferred embodiment the de-icer may further comprise at least one temperature measurement device, and means for adjusting the concentration of anti-freeze liquid in the mixed liquid in dependence of said temperature measurement. Said means could for example be means for individually controlling the flow from each of the dosage pumps. Alternatively, said means could for example be means for individually controlling the flow from each one or two of the dosage pumps—for example the dosage pump delivering the anti-freeze liquid and the dosage pump delivering water. The temperature measurement device may be situated at any suitable place on the vehicle.

Alternatively the information about the temperature can be send to the de-icer from a central server at the airport, and the de-icer may comprise means for adjusting the concentration of the anti-freeze liquid in the mixed liquid. Alternatively a central server located at the airport can send information about the mix ratio of the liquid the de-icer has to spray.

In a preferred embodiment the de-icer further comprises a heater for heating the liquid delivered to the nozzle. This can be achieved by heating the liquids already present in the tank assembly or by heating it on its way to the spraying nozzle. Hereby is achieved that—during use—the thermal energy present in the heated liquid aids in melting snow and ice present on the surface of the airplane.

In an embodiment the heater is operated to heat the liquid delivered to the nozzle in dependence of a measurement of the temperature outside the vehicle. Alternatively, both the heating of the liquid delivered to the spraying nozzle and the controlling of the flow from at least one of the dosage pumps may be done in dependence of the temperature measurement.

According to an embodiment of the de-icer the tank for additives may be fluidly connected with the tank for anti-freeze liquid for mixing the additives with the anti-freeze liquid within the tank for the anti-freeze liquid, prior to supplying said mix of additives and anti-freeze liquid to a mixing point connected with the water tank, for mixing the mix of additives and anti-freeze liquid with water prior to supplying the mixed liquid to the nozzle.

According to another embodiment the tank for additives and the tank for a thickener are each fluidly connected with the tank for the anti-freeze liquid for mixing the additives and/or the thickener with the anti-freeze liquid within the tank for the anti-freeze liquid, prior to supplying said mix of additives and/or the thickener, and anti-freeze liquid to a mixing point connected with the water tank, for mixing the mix of additives and/or the thickener and the anti-freeze liquid with water prior to supplying the mixed liquid to the nozzle. The tank for the anti-freeze liquid may be fluidly connected to a circulation pump for homogenizing and/or mixing the liquid within the anti-freeze liquid tank.

The mixing system may comprise a buffer tank, which buffer tank may be fluidly connected to the tank for the anti-freeze liquid and the tank for additives. According to another embodiment, the mixing system may comprise a buffer tank, which buffer tank may be fluidly connected to the tank for the anti-freeze liquid, and to the tank for additives, and to the tank for thickener.

The mixing system may according to an embodiment further comprise a mixing point fluidly connected to the buffer tank and the water tank, said mixing point also being fluidly connected to the nozzle via a pipe. The buffer tank may also be connected to the above mentioned mixing point via a pipe and a fifth dosage pump.

The de-icer may according to a preferred embodiment, further comprise flow metering devices measuring the flow of liquid from the fifth dosage pump and further comprise means for adjusting the flow from the fifth dosage pump in dependence of said flow measurement.

According to an embodiment, the tank assembly may further comprise a tank for a Type 2 or a Type 4 liquid, said tank being fluidly connected to the nozzle via a dosage pump.

According to the present invention, the above-mentioned object and other objects are also fulfilled by a second aspect of the invention pertaining to a method for spraying de-icing liquid on a surface of an airplane, wherein de-icing liquid is supplied to and through a spraying nozzle of a de-icing vehicle through a pipe which connects the nozzle with a tank assembly of the de-icing vehicle, the liquid being delivered to the spraying nozzle as a mix of an anti-freeze liquid, such as propylene or ethylene glycol, and additives, wherein the anti-freeze liquid is delivered to the pipe from an anti-freeze liquid tank via a first dosage pump and the additives are delivered from an additives tank via a second dosage pump.

In accordance with an embodiment of a method according to the second aspect of the invention, the liquid being delivered to the spraying nozzle may be a mix of the anti-freeze liquid, additives and water, wherein the anti-freeze liquid is delivered to the pipe from an anti-freeze liquid tank via a first dosage pump, the additives are delivered from an additives tank via a second dosage pump and the water is delivered from a water tank via a third dosage pump.

In accordance with another embodiment of a method according to the second aspect of the invention the flow from each of the first, second and third dosage pups may be measured by first, second, and third flow meters, respectively.

In an embodiment of a method according to the second aspect of the invention, the method may further comprise the step of adjusting the flow from any of the first, second and third dosage pumps in dependence of the respective flow measurements made by the first, second and third flow meters, respectively. This may be done in order to maintain the correct concentration of the different constituents in the mix.

In an embodiment of a method according to the second aspect of the invention, the method may further comprise the step of measuring the temperature of the mixed de-icing liquid.

In an embodiment of a method according to the second aspect of the invention, the method may further comprise the step of adjusting the flow from at least one of the first, second and third dosage pumps in dependence of said temperature measurement in order to for example ensure that the mixed liquid will have the correct freezing point, for example a freezing point below the measured outside temperature in the vicinity of the airplane to be de-iced.

In accordance with another embodiment of a method according to the second aspect of the invention, the de-icing liquid supplied to and through the spraying nozzle may comprise between 0.1% and 2% additives and between 4% and 88% anti-freeze liquid, such as propylene or ethylene glycol.

In accordance with yet another embodiment of a method according to the second aspect of the invention, the de-icing liquid supplied to and through the spraying nozzle comprises between 10% and 96% water.

In accordance with another embodiment of a method according to the second aspect of the invention, the liquid being delivered to the spraying nozzle is a mix of anti-freeze liquid, additives, water and a thickener, wherein the anti-freeze liquid is delivered to the pipe from an anti-freeze liquid tank via a first dosage pump, the additives are delivered from an additives tank via a second dosage pump, the water is delivered from a water tank via a third dosage pump and the thickener is delivered from a tank for a thickener via a fourth dosage pump. Hereby is achieved a method of spraying anti-icing liquid onto the surface of an airplane.

In accordance with another embodiment of a method according to the second aspect of the invention, flow from each of the first, second, third and fourth dosage pumps is measured by first, second, third and fourth flow meters, respectively.

In an embodiment of a method according to the second aspect of the invention, the method may further comprise the step of adjusting the flow from any of the first, second, third and fourth dosage pumps in dependence of the respective flow measurements made by the first, second, third and fourth flow meters, respectively—in order to maintain the correct concentration of the different constituents in the mix.

In an embodiment of a method according to the second aspect of the invention, the method may further comprise the step of measuring the temperature of the mixed de-icing liquid.

In an embodiment of a method according to the second aspect of the invention, the method may further comprise the step of adjusting the flow from at least one of the first, second, third and fourth dosage pumps in dependence of said temperature measurement.

In accordance with another embodiment of a method according to the second aspect of the invention, the de-icing liquid and/or anti-icing liquid supplied to and through the spraying nozzle comprises between 0.1% and 2% additives, between 0.1% and 2% thickener and between 2.5% and 50% anti-freeze liquid, such as propylene or ethylene glycol.

In accordance with an embodiment of a method according to the second aspect of the invention, the de-icing liquid and/or anti-icing liquid supplied to and through the spraying nozzle comprises between 48% and 97.5% water. In a preferred embodiment the above mentioned thickener comprises polymers.

In accordance with an embodiment of a method according to the second aspect of the invention, the thickener is mixed with anti-freeze liquid prior to mixing it with additives and water. In accordance with an embodiment of a method according to the second aspect of the invention, the thickener is mixed with the anti-freeze liquid, and then with additives and then with water.

In an embodiment of a method according to the second aspect of the invention, the method may further comprise the step of delivering the thickener and additives to the tank with the anti-freeze liquid, and homogenizing the additives, thickener and anti-freeze liquid, before delivering the homogenized liquid to the nozzle via a dosage pump.

In an embodiment of a method according to the second aspect of the invention, the method may further comprise the step of mixing the homogenized additives, anti-freeze liquid and thickener with water at a mixing point before delivering it to the nozzle.

In an embodiment of a method according to the second aspect of the invention, the method may further comprise the step of delivering the thickener, and anti-freeze liquid and the additives to a buffer tank, wherein it is mixed together and homogenized, before being delivered to the nozzle.

In an embodiment of a method according to the second aspect of the invention, the method may further comprise the step of delivering the additives to the tank with the anti-freeze liquid, and homogenizing the additives and anti-freeze liquid, before delivering the homogenized liquid to the nozzle via a dosage pump.

In an embodiment of a method according to the second aspect of the invention, the method may further comprise the step of mixing the homogenized additives and anti-freeze liquid with water at a mixing point before delivering it to the nozzle.

In an embodiment of a method according to the second aspect of the invention, the method may further comprise the step of delivering the anti-freeze liquid and the additives to a buffer tank, wherein it is mixed together and homogenized, before being delivered to the nozzle.

In an embodiment of a method according to the second aspect of the invention, the method may further comprise the step of mixing the homogenized additives and anti-freeze liquid with water at a mixing point before delivering it to the nozzle.

According to the present invention, the above-mentioned object and other objects are also fulfilled by a third aspect of the invention pertaining to a method of spraying anti-icing liquid on a surface of an airplane, wherein anti-icing liquid is supplied to and through a spraying nozzle of a de-icing vehicle through a pipe which connects the nozzle with a tank assembly of the de-icing vehicle, the liquid being delivered to the spraying nozzle as a mix of an anti-freeze liquid, such as propylene or ethylene glycol, additives, water and a thickener, wherein the anti-freeze liquid is delivered to the pipe from a anti-freeze liquid tank via a first dosage pump, the additives are delivered from an additives tank via a second dosage pump, the water is delivered from a water tank via a third dosage pump and the thickener is delivered from a thickener tank to the pipe via a fourth dosage pump.

In accordance with an embodiment of a method according to the third aspect of the invention, the flow from each of the first, second, third and fourth dosage pumps is measured by first, second, third and fourth flow meters, respectively.

In an embodiment of a method according to the third aspect of the invention, the method may further comprise the step of adjusting the flow from any of the first, second, third and fourth dosage pumps in dependence of the respective flow measurements made by the first, second, third and fourth flow meters, respectively—in order to maintain the correct concentration of the different constituents in the mix.

In another embodiment of a method according to the third aspect of the invention, the method may further comprise the step of measuring the temperature of the mixed anti-icing liquid.

In an embodiment of a method according to the third aspect of the invention, the method may further comprise the step of adjusting the flow from at least one of the first, second, third and fourth dosage pumps in dependence of said temperature measurement.

In accordance with an embodiment of a method according to the third aspect of the invention, the anti-icing liquid supplied to and through the spraying nozzle may comprise between 0.1% and 2% additives, between 0.1% and 2% of a thickener and between 2.5% and 50% an anti-freeze liquid, such as propylene or ethylene glycol.

In accordance with an embodiment of a method according to the third aspect of the invention, the de-icing liquid and/or anti-icing liquid supplied to and through the spraying nozzle may comprise between 48% and 97.5% water. According to a preferred embodiment of a method according to the third aspect of the invention, the thickener comprises polymers.

In an embodiment of a method according to the third aspect of the invention, the method may further comprise the step of delivering the thickener and additives to the tank with the anti-freeze liquid, and homogenizing the additives, thickener and anti-freeze liquid, before delivering the homogenized liquid to the nozzle via a dosage pump.

In an embodiment of a method according to the third aspect of the invention, the method may further comprise the step of mixing the homogenized additives, anti-freeze liquid and thickener with water at a mixing point before delivering it to the nozzle.

In an embodiment of a method according to the third aspect of the invention, the method may further comprise the step of delivering the thickener, the anti-freeze liquid and the additives to a buffer tank, wherein it is mixed together and homogenized, before being delivered to the nozzle.

The anti-freeze liquid used may according to an embodiment of any of the above mentioned aspects of the invention comprise any of the following constituents: propylene, ethylene glycol, glycerin or glycol based on corn.

According to an embodiment of any of the above mentioned aspects of the invention, the thickener can be provided as a mix of a thickener and additives used in connection with a thickener, one of these additives could be a dye—having a different colour as the dye used in de-icing liquids, whereby it would be easier for an operator to distinguish between the de-icing and the anti-icing. Alternatively, the only additive provided together with the thickener in the thickener tank, may be a dye, different from (preferably green) the dye provided in the additives tank.

According to a preferred embodiment of any of the above-mentioned aspects of the invention, each of the flow metering devices are operatively connected to a central processor. Furthermore, the temperature measurement device is also preferably operatively connected to the central processor. Said central processor is also according to a preferred embodiment of any of the above-mentioned aspects of the invention operatively connected to each of the dosage pumps, whereby the flow of liquid trough any of the dosage pumps can be regulated on the basis of input from said flow metering devices and possibly also an input signal from said temperature measurement device. The central processor is preferably pre-programmed to control the pumps in order to optimize the usage of the liquids. The Central Processor may also be operatively connected to the heater for heating any of the liquids in dependence of the temperature measurement.

Another aspect of the invention pertains to a de-icer for airplanes, comprising: a self-propelled vehicle provided with a lifting device for lifting and positioning a spraying nozzle in the vicinity of an outer surface of an airplane to be de-iced, the nozzle being fluidly connected to a tank assembly via at least one pipe, wherein the tank assembly comprises separate tanks with an anti-freeze liquid, such as propylene or ethylene glycol, with additives and with water, each tank of the tank assembly being fluidly connected to a mixing system via pipes, the mixing system being configured for mixing the liquids from each of the tanks before supplying the mixed liquid to the nozzle. According to an embodiment of the above-mentioned other aspects of the invention, the tank assembly may further comprise a tank with a thickener, such as polymers or a thickener comprising polymers.

BRIEF DESCRIPTION OF THE DRAWINGS

A further understanding of the nature and advantages of the present invention may be realized by reference to the remaining portions of the specification and the drawings. In the following, preferred embodiments of the invention is explained in more detail with reference to the drawings, wherein.

DETAILED DESCRIPTION

Figure 1:
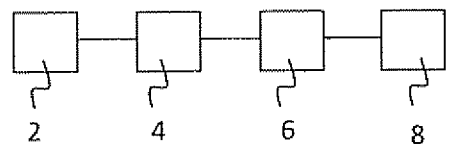
FIG. 1 shows a flow diagram of an embodiment of a method according to the invention.

The present invention will now be described in greater detail hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

FIG. 1 shows a flow diagram of an embodiment of a method for spraying de-icing liquid on a surface of an airplane wherein de-icing liquid is supplied to and through a spraying nozzle of a de-icing vehicle through a pipe which connects the nozzle with a tank assembly of the de-icing vehicle, the liquid being delivered to the spraying nozzle as a mix of propylene or ethylene glycol and additives, wherein the propylene or ethylene glycol is delivered to the pipe from a propylene or ethylene tank via a first dosage pump and the additives are delivered from an additives tank via a second dosage pump. Essentially the method comprises the step 2 of providing a tank with propylene or ethylene glycol in a de-icing vehicle, a step 4 of providing a tank with additives in the de-icing vehicle, a step 6 of mixing the propylene or ethylene glycol and the additives continuously while spraying the de-icing liquid as indicated by step 8.

Figure 2:
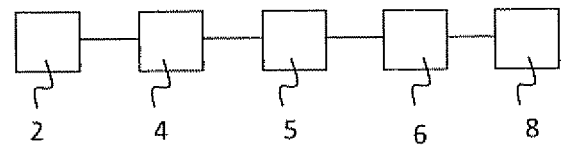
FIG. 2 shows a flow diagram of another embodiment of method according to the invention.

FIG. 2 shows a flow diagram of an embodiment of a method for spraying de-icing liquid on a surface of an airplane wherein the liquid being delivered to the spraying nozzle is a mix of propylene or ethylene glycol, additives and water, and wherein the propylene or ethylene glycol is delivered to the pipe from a propylene or ethylene tank via a first dosage pump, the additives are delivered from an additives tank via a second dosage pump and the water is delivered from a water tank via a third dosage pump. Essentially, the method illustrated in FIG. 2 comprises the step 2 of providing a tank with propylene or ethylene glycol in a de-icing vehicle, a step 4 of providing a tank with additives in the de-icing vehicle, a step 5 of providing a tank with water in the de-icing vehicle, a step 6 of mixing the propylene or ethylene glycol and the additives continuously while spraying the de-icing liquid as indicated by step 8.

Figure 3:
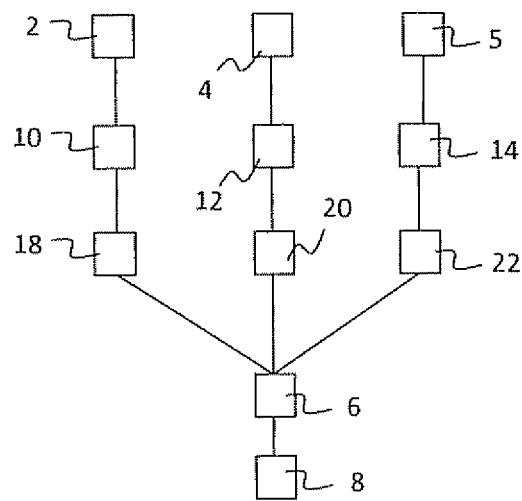
FIG. 3 shows a flow diagram of yet another embodiment of a method according to the invention.

FIG. 3 shows a flow diagram of an embodiment of a method for spraying de-icing liquid on a surface of an airplane wherein the liquid being delivered to the spraying nozzle is a mix of propylene or ethylene glycol, additives and water, and wherein the propylene or ethylene glycol is delivered to the pipe from a propylene or ethylene tank via a first dosage pump, the additives are delivered from an additives tank via a second dosage pump and the water is delivered from a water tank via a third dosage pump, and wherein the flow from each of the first, second and third dosage pumps is measured by first, second, and third flow meters, respectively. Essentially, the method illustrated in FIG. 3 comprises the step 2 of providing a tank with propylene or ethylene glycol in a de-icing vehicle, a step 4 of providing a tank with additives in the de-icing vehicle, a step 5 of providing a tank with water in the de-icing vehicle, a step 10 of providing a first dosage pump connected to the tank with propylene or ethylene glycol, a step 12 of providing a second dosage pump connected to the tank with additives, a step 14 of providing a third dosage pump connected to the water tank, a step 18 of measuring the flow from the first dosage pump, a step 20 of measuring the flow from the second dosage pump, a step 22 of measuring the flow from the third dosage pump, a step 6 of mixing the propylene or ethylene glycol and the additives continuously while spraying the de-icing liquid as indicated by step 8.

Figure 4:
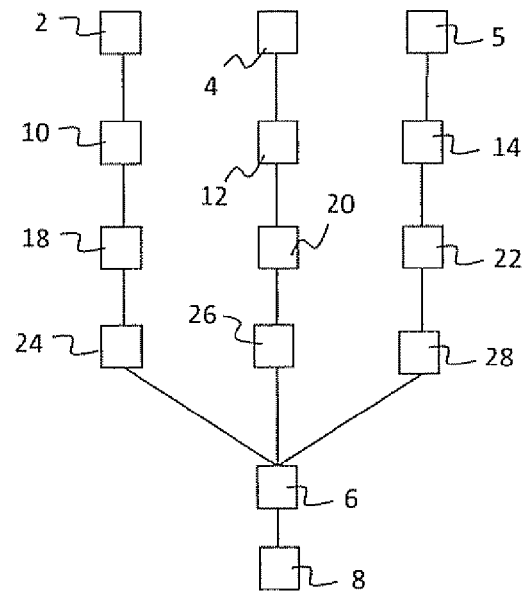
FIG. 4 shows a flow diagram of an embodiment of a method according to the invention.

FIG. 4 shows a flow diagram of an embodiment of a method for spraying de-icing liquid on a surface of an airplane essentially comprising the same steps as shown in FIG. 3. Therefore only the difference will be described. As illustrated with the functional blocks 24, 26 and 28 the method illustrated in FIG. 4 further comprises the steps 24, 26 and 28 of adjusting the flow from any of the first, second and third dosage pumps in dependence of the respective flow measurements 18, 20 and 22 made by the first, second and third flow meters, respectively.

Any of the methods illustrated in the FIGS. 1-4 may further comprise the step of measuring the temperature of the mixed de-icing liquid.

Any of the methods illustrated in the FIGS. 1-4 may further comprise the step of adjusting the flow from at least one of the first, second and third dosage pumps in dependence of said temperature measurement.

Preferably, the de-icing liquid supplied to and through the spraying nozzle may comprise between 0.1% and 2% additives and between 4% and 88% propylene or ethylene glycol.

The de-icing liquid may be supplied to and through the spraying nozzle may comprise between 10% and 96% water.

Figure 5:
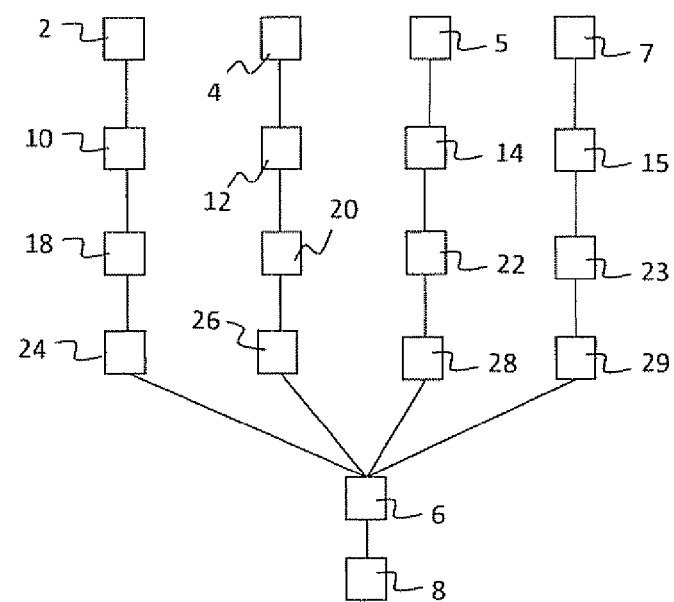
FIG. 5 shows a flow diagram of an embodiment of a method according to the invention.

FIG. 5 shows a flow diagram of an embodiment of a method for spraying anti-icing liquid on a surface of an airplane essentially comprising many of the same steps as shown in FIG. 4. Therefore only the difference will be described. Here the liquid being delivered to the spraying nozzle is a mix of propylene or ethylene glycol, additives, water and polymers (i.e. it is an anti-icing liquid), wherein the propylene or ethylene glycol is delivered to the pipe from a propylene or ethylene tank via a first dosage pump, the additives are delivered from an additives tank via a second dosage pump, the water is delivered from a water tank via a third dosage pump and the polymers are delivered from a polymer tank via a fourth dosage pump, and wherein flow from each of the first, second, third and fourth dosage pumps is measured by first, second, third and fourth flow meters, respectively, further comprising the steps of adjusting the flow from any of the first, second, third and fourth dosage pumps in dependence of the respective flow measurements made by the first, second, third and fourth flow meters, respectively in order to maintain the correct concentration of the different constituents in the mix. In addition to the steps illustrated in FIG. 4, the method illustrated in FIG. 5 also comprises a step 7 of providing a tank for polymers within the vehicle, a step 15 of providing a fourth dosage pump connected to the tank with polymers, a step 23 of measuring the flow from the fourth dosage pump, and a step 29 of adjusting the flow from the fourth dosage pump in dependence of said flow measurement.

The method illustrated in FIG. 5 may further comprise the step of measuring the temperature of the mixed de-icing liquid, and the step of adjusting the flow from at least one of the first, second, third and fourth dosage pumps in dependence of said temperature measurement.

According to the method illustrated in FIG. 5, the liquid supplied to and through the spraying nozzle preferably comprises between 0.1% and 2% additives, between 0.1% and 2% polymers, between 4% and 88% propylene or ethylene glycol and between 10% and 96% water.

Figure 6:
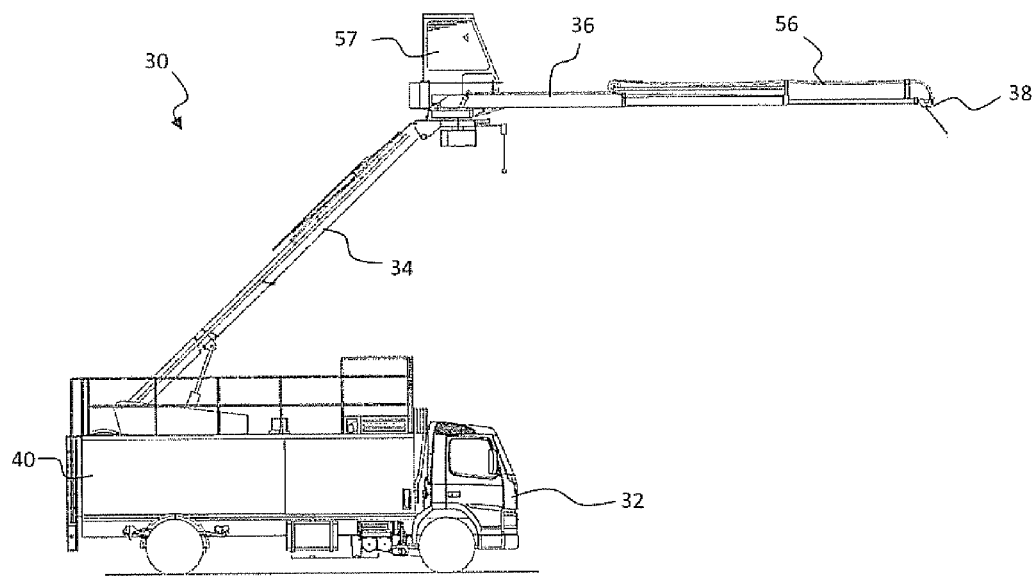
FIG. 6 shows schematically an embodiment of a de-icer, FIG. 7 schematically illustrates a tank assembly and mixing system according to the invention, FIG. 8 schematically shows another embodiment of a tank assembly and its connection to a spraying nozzle, FIG. 9 schematically shows yet another embodiment of a tank assembly and its connection to a spraying nozzle, FIG. 10 schematically shows a further embodiment of a tank assembly and its connection to a spraying nozzle, and FIG. 11 schematically shows yet a further embodiment of a tank assembly and its connection to a spraying nozzle.

FIG. 6 shows a preferred embodiment of a de-icer 30 for de-icing surfaces of airplanes. The illustrated de-icer 30 comprises a self-propelled vehicle 32 provided with a lifting device in the form of boom arms 34 and 36 for lifting and positioning a spraying nozzle 38 in the vicinity of an outer surface of an airplane (not shown) to be de-iced. The nozzle 38 is fluidly connected to a tank assembly 40 via at least one pipe 56. The pipe 56 is preferably a flexible hose, and the boom arm 36 is in the illustrated embodiment telescopic. The illustrated de-icer 30 is also equipped with an operator platform 57.

Figure 7:
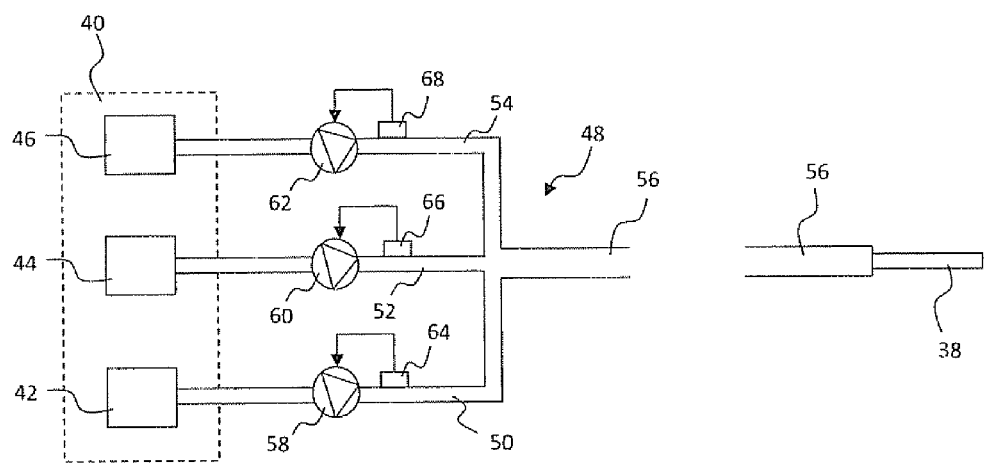

In FIG. 7 the tank assembly 40 and its connection to the spraying nozzle 38 schematically illustrated. The tank assembly 40 comprises three separate tanks. One tank 42 for propylene or ethylene glycol, one tank 44 for additives, and one tank 46 for water, each tank 42, 44, 46 of the tank assembly 40 is fluidly connected to a mixing system 48 via pipes 50, 52, 54, the mixing system 48 being configured for mixing the liquids from each of the tanks 42, 44, 46 before supplying the mixed liquid to the nozzle 38 via the pipe 56. According to another embodiment the tank assembly 40 may further comprise a tank (not shown) for polymers in which case the de-icer 30 also may operate as an anti-icer.

As illustrated each tank 42, 44, 46 of the tank assembly 40 is connected to a respective dosage pump 58, 60, 62 for supplying the individual liquid to the mixing system 48. The de-icer 30 further comprises flow metering devices 64, 66, 68 measuring the flow of liquid from each pump 58, 60 and 62. The de-icer 30 further comprises means for adjusting the flow from each of the pumps 58, 60, 62 in dependence of said flow measurement. This is schematically illustrated by the feedback arrows from the flow metering devices 64, 66, 68 to the pumps 58, 60, 62. In a practical embodiment the flow metering devices 64, 66, 68 and the pumps 58, 60, 62 will be operatively connected to a central processor (e.g. a computer), which central processor (not shown) controls the pumps 58, 60, 62 in dependence of the flow measurements performed by the flow metering devices 64, 66, 68 and/or manual input from the operator.

The de-icer 30 may according to an embodiment further comprise at least one temperature measurement device, and means for adjusting the concentration of propylene or ethylene glycol in the mixed liquid in dependence of said temperature measurement. This may for example be achieved by having the temperature measurement device operatively connected to a central processor, which in turn can control the operation of the pumps.

The de-icer 30 may further comprise a heater (not shown) for heating the liquid delivered to the nozzle 38. This can for example be done by heating the water in the water tank 46 and/or heating the propylene or ethylene glycol in the tank 42. The heater may in one embodiment further be operated to heat the liquid delivered to the nozzle 38 in dependence of a measurement of the temperature outside the vehicle 32.

Figure 8:
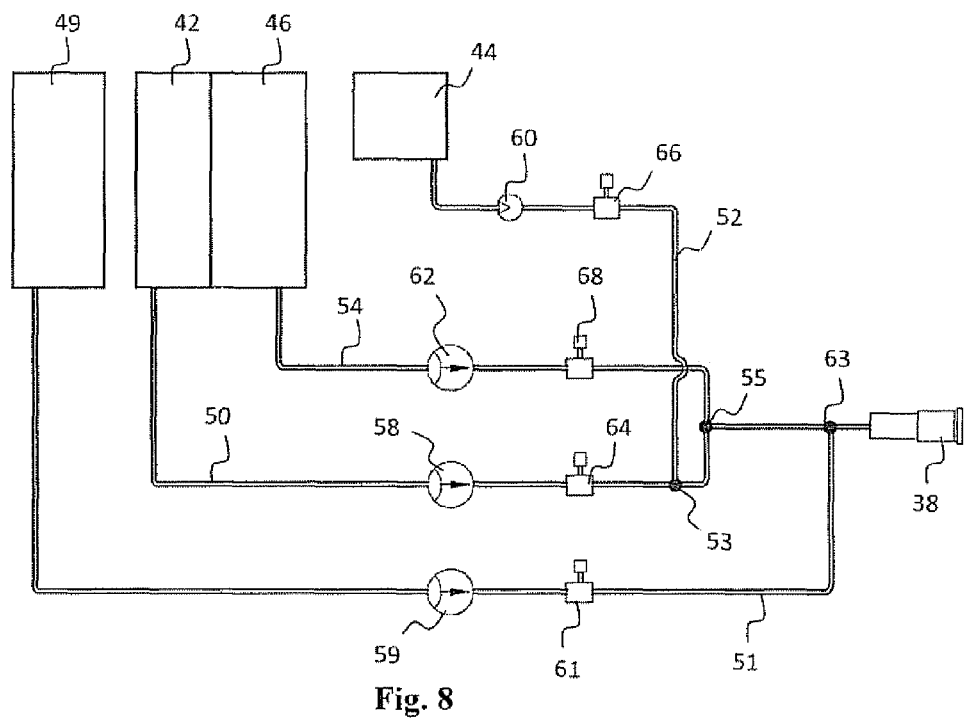

In FIG. 8 another embodiment of a tank assembly 40 and its connection to the spraying nozzle 38 is schematically illustrated. The tank assembly 40 comprises four separate tanks. One tank 42 for propylene or ethylene glycol, one tank 44 for additives, one tank 46 for water and one tank 49 for Type 2 or Type 4 de-icing liquid. According to this embodiment additives from the tank 44 are mixed with propylene or ethylene glycol supplied from the tank 42 at the mixing point 53, hereafter the mix of additives and propylene or ethylene glycol is mixed with water at the mixing point 55. The mix of additives, water and propylene or ethylene glycol is then supplied to the spraying nozzle 38 as de-icing fluid. For anti-icing the anti-icing fluid a Type 2 or Type 4 fluid is supplied form the tank 49. The individual liquids are delivered via respective dosage pumps 58, 59, 60, 62. In the pipe 51, downstream from the pump 59 a flow metering device 61 is placed by which the flow of anti-icing liquid delivered by the dosage pump 59 is measured. Similarly flow metering devices 64, 68 and 66 are placed in the pipes 50, 54 and 52, respectively. As described above with reference to FIG. 7, the pumps 58, 59, 60, 62 can be operatively connected to the flow metering devices in the same pipe as the pumps are placed, so that they can be adjusted in dependence of a flow measurement. In the illustrated embodiment the mixing system comprises the mixing points 53, 55 and 63. When using a de-icer having a tank assembly as schematically illustrated in FIG. 8, an outer surface of the airplane is first sprayed with a mix of propylene or ethylene glycol and additives (and usually also water) in order to remove the ice and snow deposits on the airplane. Afterwards the Type 2 or Type 4 liquid (possibly mixed with water from the water tank 46) is sprayed onto the de-iced surface of the airplane in order to prevent formation of new ice before takeoff. Hence the mixing point 63 is placed as close to the nozzle 38 as possible, because then a smaller part of the pipe 56 needs to be flushed with the Type 2 or Type 4 liquid, before spraying of the anti-icing liquid may commence. Hereby only a very small amount of de-icing liquid is wasted. The Type 2 and Type 4 liquid may also be mixed with water.

Figure 9:
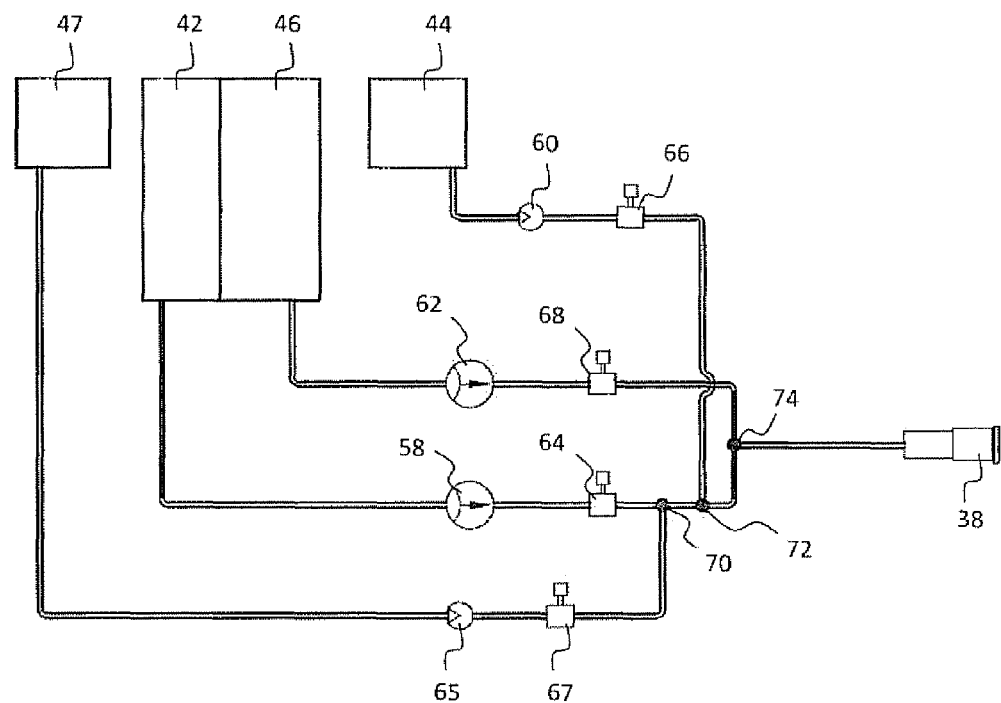

In FIG. 9 yet another embodiment of a tank assembly 40 and its connection to the spraying nozzle 38 is schematically illustrated. The illustrated tank assembly 40 comprises four separate tanks. One tank 42 for propylene or ethylene glycol, one tank 44 for additives, one tank 46 for water and one tank 47 for polymers. A de-icer vehicle with this configuration of the tank assembly can be used as both de-icer and anti-icer.

Since many of the individual components are similar to the ones shown in FIG. 8, only the differences between these two embodiments are described. During use of the illustrated embodiment, polymers and propylene or ethylene glycol are mixed at the mixing point 70 and then mixed with additives at the mixing point 72. Finally, the mix of polymers, propylene or ethylene glycol, and additives is mixed with water at the mixing point 74, before being delivered to the spraying nozzle 38. By placing the mixing points as illustrated, and especially in the illustrated order, it is thus ensured that the polymers and propylene or ethylene glycol is properly mixed, before being sprayed through the nozzle 38.

Figure 10:
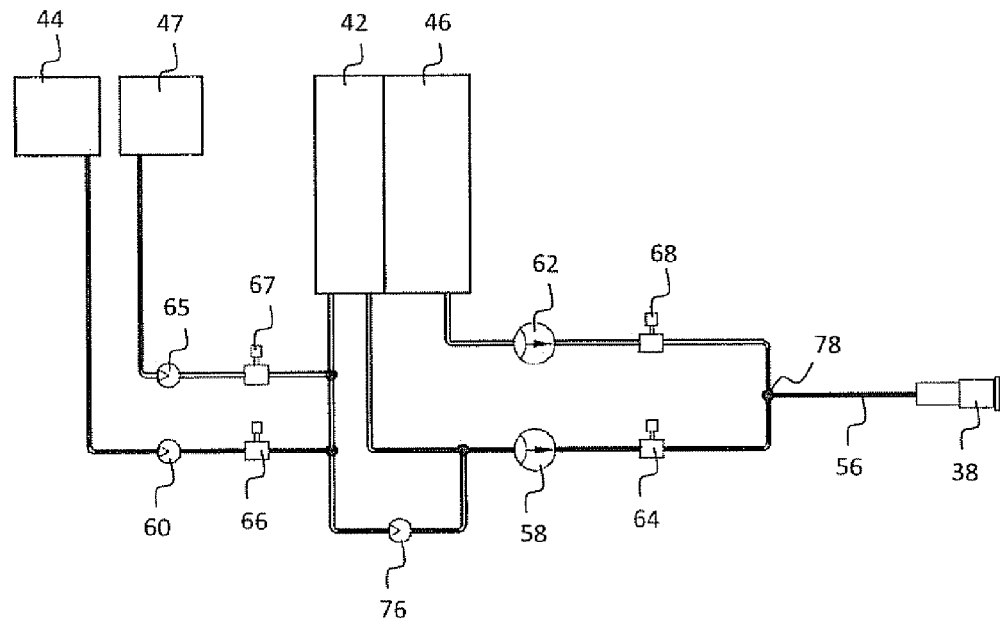

In FIG. 10 a further embodiment of a tank assembly 40 and its connection to the spraying nozzle 38 is schematically illustrated. The illustrated tank assembly 40 comprises four separate tanks. One tank 42 for propylene or ethylene glycol, one tank 44 for additives, one tank 46 for water and one tank 47 for polymers. In this embodiment additives and polymers are delivered to the tank 42 and mixed with propylene or ethylene glycol before being used. A circulating pump 76 connected to the tank 42 is used to blend and homogenize the propylene or ethylene glycol, additives and polymers properly. The mix of propylene or ethylene glycol, additives and polymers is then delivered to the mixing point 78 via a dosage pump 58, where it is mixed with water that is delivered from the water tank 46 via the dosage pump 62.

Figure 11:
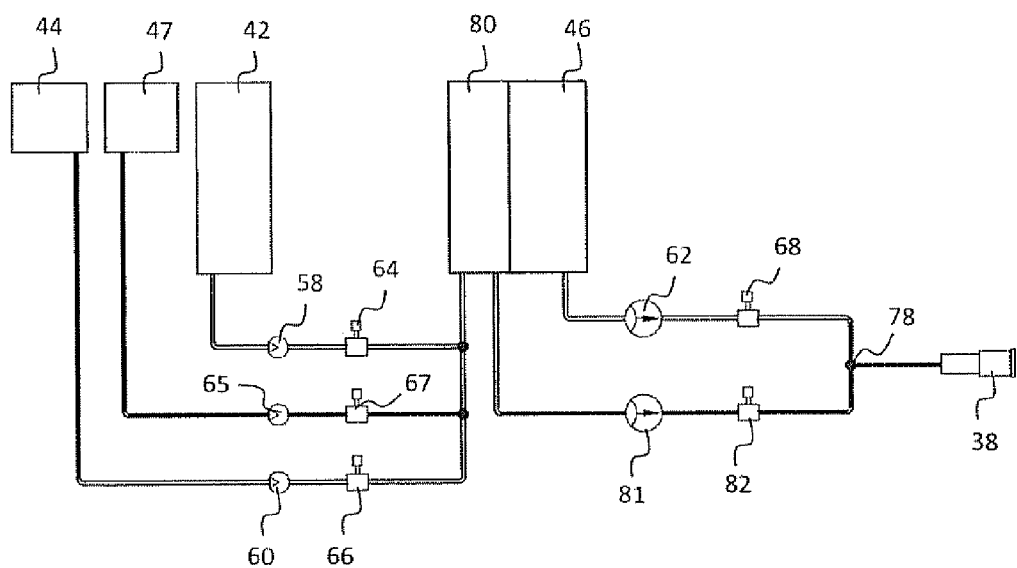

In FIG. 11 a yet further embodiment of a tank assembly 40 and its connection to the spraying nozzle 38 is schematically illustrated. The illustrated tank assembly 40 comprises five separate tanks. One tank 42 for propylene or ethylene glycol, one tank 44 for additives, one tank 46 for water, one tank 47 for polymers, and one buffer tank 80. According to this embodiment additives and propylene or ethylene glycol are delivered to the buffer tank 80 and mixed together, before being delivered to the mixing point 78 via dosage pump 81, at which mixing point 78 it is mixed with water that is delivered from the water tank 46 via dosage pump 62. Hereby the de-icing liquid is mixed in the buffer tank 80, before being diluted with water and delivered to the nozzle 38. If anti-icing also required, polymers can be delivered to the buffer tank 80 as well as additives and propylene or ethylene glycol, whereby an anti-icing liquid can be buffer in the tank 80, before being delivered to the nozzle 38. The buffer tank is preferably equipped with means (not shown) for stirring and homogenizing the liquid within it.

LIST OF REFERENCE NUMBERS

In the following is given a list of reference numbers that are used in the detailed description of the invention:
2 method step of providing a tank for propylene or ethylene glycol,
4 method step of providing a tank for additives,
5 method step of providing a water tank,
6 method step of mixing the individual liquids,
7 method step of providing a polymer tank,
8 method step of spraying mixed liquid through a nozzle,
10 method step of providing a first dosage pump,
12 method step of providing a second dosage pump,
14 method step of providing a third dosage pump,
15 method step of providing a fourth dosage pump,
18, 20, 22, 23 method steps of flow measurements,
24, 26, 28, 29 method steps of adjusting flow in dependence of flow measurements,
30 de-icer,
32 self propelled vehicle,
34, 36 boom arms of lifting device,
38 spraying nozzle,
40 tank assembly,
42 tank for propylene or ethylene glycol,
44 tank for additives,
46 water tank,
48 mixing system,
49 tank for Type 2 or Type 4 liquid,
53, 63, 56, 70, 72, 74, 78 mixing points,
50, 51 52, 54, 56 pipes connecting the tanks and the nozzle,
57 operator platform,
58, 59 60, 62, 81 dosage pumps,
61, 64, 66, 68, 82 flow metering devices,
76 circulating pump, and
80 buffer tank

The invention claimed is:

1. A method for spraying de-icing liquid on a surface of an airplane, comprising:
 delivering anti-freeze liquid from an anti-freeze liquid tank to a pipe that connects a spraying nozzle of a de-icing vehicle with a tank assembly of the de-icing vehicle via a first dosage pump;
 delivering additives from an additives tank to the pipe via a second dosage pump; and
 supplying de-icing liquid to and through the spraying nozzle of the de-icing vehicle through the pipe that connects the spraying nozzle with the tank assembly of the de-icing vehicle, and
 wherein the de-icing liquid is delivered to the spraying nozzle as a mix of the anti-freeze liquid and the additives, and
 wherein the additives are chemical agents that act as surfactants, flame inhibitors, de-foamers, or anti-corrosion agents within the de-icing liquid.

2. A method according to claim 1, wherein the de-icing liquid delivered to the spraying nozzle is a mix of the anti-freeze liquid, the additives, and water, and wherein the water is delivered from a water tank to the pipe via a third dosage pump.

3. A method according to claim 2, wherein flow from each of the first, second, and third dosage pumps is measured by first, second, and third flow meters, respectively.

4. A method according to claim 3, further comprising adjusting the flow from any of the first, second, and third dosage pumps based on respective flow measurements made by the first, second, and third flow meters, respectively.

5. A method according to claim 4, further comprising measuring an outside ambient temperature.

6. A method according to claim 5, further comprising adjusting the flow from at least one of the first, second, and third dosage pumps based on the outside ambient temperature as measured.

7. A method according to claim 6, wherein the de-icing liquid supplied to and through the spraying nozzle comprises between 0.1% and 2% of the additives and between 4% and 88% of the anti-freeze liquid.

8. A method according to claim 7, wherein the de-icing liquid supplied to and through the spraying nozzle comprises between 10% and 96% of the water.

9. A method according to claim 2, further comprising spraying the de-icing liquid on a surface of an airplane, wherein the de-icing liquid delivered to the spraying nozzle is a mix of the anti-freeze liquid, the additives, water, and a thickener, and wherein the thickener is delivered from a thickener tank to the pipe via a fourth dosage pump.

10. A method according to claim 9, wherein flow from each of the first, second, third and fourth dosage pumps is measured by first, second, third and fourth flow meters, respectively.

11. A method according to claim 10, further comprising adjusting the flow from any of the first, second, third, and fourth dosage pumps based on respective flow measurements made by the first, second, third, and fourth flow meters, respectively.

12. A method according to claim 9, further comprising measuring an outside ambient temperature.

13. A method according to claim 12, further comprising adjusting flow from at least one of the first, second, third, and fourth dosage pumps based on the outside ambient temperature as measured.

14. A method according to claim 9, further comprising adjusting flow from at least one of the first, second, third, and fourth dosage pumps based on a transmitted temperature sent from a server at an airport.

15. A method according to claim 9, wherein the de-icing liquid supplied to and through the spraying nozzle comprises between 0.1% and 2% of the additives, between 0.1% and 2% of the thickener, and between 2.5% and 50% of the anti-freeze liquid.

16. A method according to claim 9, wherein the de-icing liquid supplied to and through the spraying nozzle comprises between 48% and 97.5% of the water.

17. A method according to claim 9, wherein the thickener comprises polymers.

18. A method according to claim 9, wherein the thickener is mixed with the anti-freeze liquid prior to being mixed with the additives and the water.

19. A method according to claim 9, wherein the thickener is mixed with the anti-freeze liquid, then with the additives, and then with the water.

20. A method according to claim 9, further comprising delivering the thickener and the additives to the tank assembly with the anti-freeze liquid, homogenizing the additives, the thickener, and the anti-freeze liquid to form a homogenized liquid, and delivering the homogenized liquid to the spraying nozzle via a circulating pump.

21. A method according to claim 20, further comprising mixing the homogenized liquid with water at a mixing point before delivering the homogenized liquid to the spraying nozzle.

22. A method according to claim 9, further comprising delivering the thickener, the anti-freeze liquid, and the additives to a buffer tank, and wherein the thickener, the anti-freeze liquid, and the additives are mixed together and homogenized before being delivered to the spraying nozzle.

23. A method according to claim 2, further comprising delivering the additives to the tank assembly with the anti-freeze liquid, homogenizing the additives and the anti-freeze liquid to form a homogenized liquid, and delivering the homogenized liquid to the spraying nozzle via a dosage pump.

24. A method according to claim 23, further comprising mixing the homogenized liquid with the water at a mixing point before delivering the homogenized liquid to the spraying nozzle.

25. A method according to claim 2, further comprising delivering the anti-freeze liquid and the additives to a buffer tank, and wherein the anti-freeze liquid and the additives are mixed together and homogenized before being delivered to the spraying nozzle.

26. A method according to claim 25, further comprising mixing the homogenized additives and anti-freeze liquid with the water at a mixing point before delivering the homogenized additives and anti-freeze liquid to the spraying nozzle.

\* \* \* \* \*